Oct. 25, 1927.
G. LAMARQUE ET AL
1,646,916
APPARATUS FOR SERVING OUT BEER
Filed Oct. 8, 1926      2 Sheets-Sheet 1
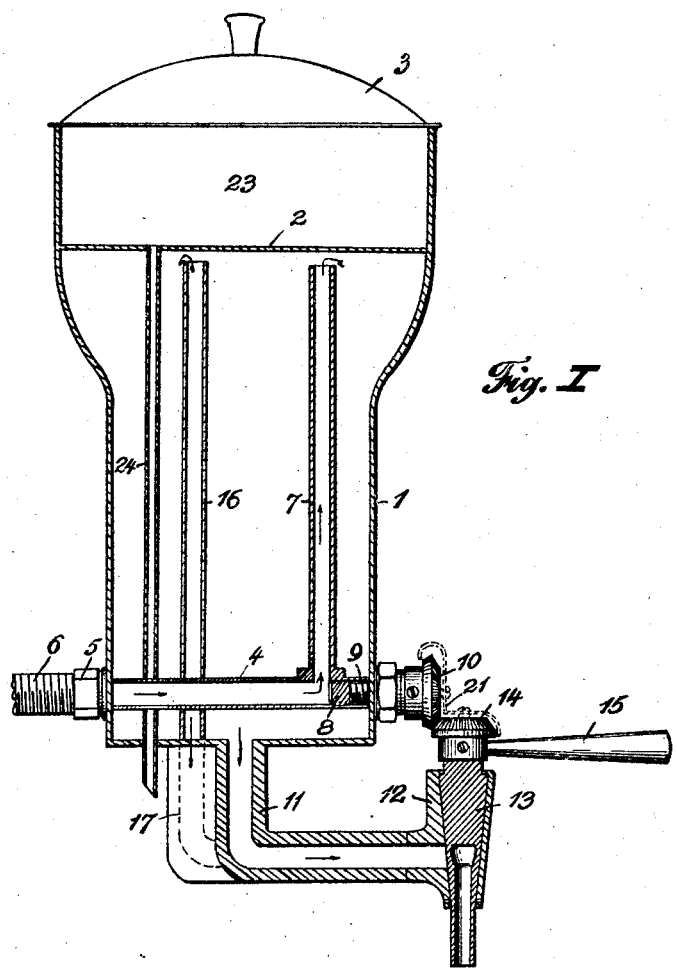
Fig. I
Inventors
G. Lamarque and C. Recuero
by Laurier, Parry, Card & Laurier
Att'ys.

Oct. 25, 1927. 1,646,916
G. LAMARQUE ET AL
APPARATUS FOR SERVING OUT BEER
Filed Oct. 8, 1926   2 Sheets-Sheet 2
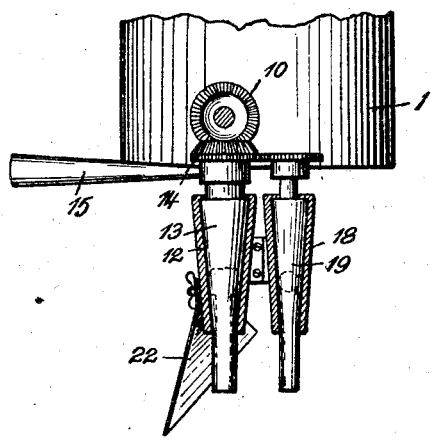
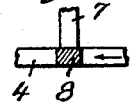 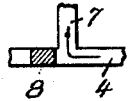 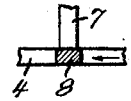
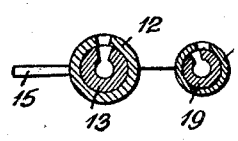 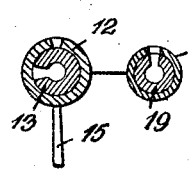 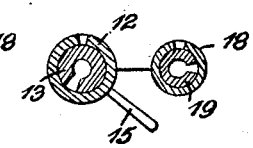
Inventors
G. Lamarque and C. Recuero
by Langner, Parry, Card & Langner
Att'ys.

Patented Oct. 25, 1927.

1,646,916

UNITED STATES PATENT OFFICE.

GAUDENCIO LAMARQUE AND CAMILO RECUERO, OF BUENOS AIRES, ARGENTINA.

APPARATUS FOR SERVING OUT BEER.

Application filed October 8, 1926. Serial No. 140,351.

The present invention relates to apparatus for serving out beer and similar beverages and has for its object to provide an improved device of this kind capable of avoiding the disadvantages shown in the methods heretofore used.

As is generally known, in taverns, barrooms, or other places where beer is served out to consumers, this is generally effected from barrels and with the aid of carbonic acid under pressure, thus the conditions of expenditure, as regards satisfaction of the consumer and the amount of liquid wasted depend entirely upon the skill of the barman.

Further, during the hot season, the increase in the demand for cooled beverages does not allow for sufficient time for serving out the liquid under normal conditions so that waste is very likely to occur with the consequent losses to the proprietor of the place.

With the aid of the present invention all these disadvantages are avoided, since the improved device provides for an absolute control of discharge of foamless beer, or foam alone, just as desired, whereby it is possible to serve out the beer or other liquid at complete satisfaction of even the most exacting consumer and, simultaneously, there are no possibilities for any amount of liquid being wasted. As well, the present device constitutes an important improvement over the devices known in the prior art since it provides for more continuous dispensing.

The device according to the invention is characterized by the fact that beer is admitted within a container of suitable form, size and material and, through the provision of tubes opening into discharge cocks combined one with the other, the discharge of the liquid, or of the foam formed by the pressure gas, may be exactly controlled so that the discharge is effected entirely at will. In this manner, when serving out a can or glass of beer, firstly liquid beer without foam is discharged until reaching the desired limit, and then a suitable amount of foam is added until filling completely the can or glass used.

In the accompanying drawings illustrating one form of carrying the invention into effect, Fig. I is a diagrammatic section of the unit, Fig. II is a front view, partially in section, of the discharge devices, and Figs. III, IV and V are diagrams illustrating the different positions of the discharge devices in relation one to another and to the inlet tube.

In these drawings, 1 indicates the container or outer cover which may be of suitable form and size. At its upper portion this container is divided by a wall 2 and the whole is crowned by a lid 3. A tube 4 extends across the lower portion of said container 1 and is secured to the latter by means of a nut 5. This end of tube 4 constitutes the inlet or charging port of the device, a thread 6 being provided for securing the unit to the usual ice-box or refrigerating worm. From a point of the said tube 4 extends vertically upwards another tube 7, the free end of which reaches a point near the under surface of wall 2 and the communication between both tubes 4 and 7 is opened or closed according to the relative position of a valve 8 actuated by a threaded shaft 9 which extends past the wall of the container 1 and carries at its free end a bevel pinion 10. At the bottom of the container 1 there is provided an opening or discharge port leading into a tube 11, bent at right angles and the free end of which communicates with, and serves as a support for, a discharge cock 12, the stem 13 of which carries, firmly secured to its upper end, a bevel gear 14 which meshes with the said pinion 10. Besides, a handle 15 is provided on said stem 13 for actuation of the device. At a point near the discharge opening of the container 1, there is provided a further tube 16 extending vertically upwards and which is in communication with another curved tube or hollow arm 17, secured to the bottom of the container and its free end serves as a support for, and is in communication with, a second cock 18 (see Fig. II) the stem 19 of which carries at its upper portion a gear 20 in mesh with the said bevel gear 14.

The operation of the present device is as follows.

After the device has been secured to the ice-box, barrel or refrigerating worm by means of the threaded portion of tube 4, the handle 15 is moved sideways until the passage between tubes 4 and 7 is opened, thus permitting the beer under pressure to pass on and fill the container 1. In this position, the cock 13 is completely closed and cock 18 is totally open, however by virtue of the position of the upper end of tube 7, at this stage there may be discharged solely foam as driven up by the pressure gas (see Fig. IV). On moving the handle 15 further to the left, in an extension of 90° (see Fig. III), the valve 8 will be totally closed; thus further liquid under pressure is prevented from entering the container. Now, since this last operation has completely opened the cock 12, closing almost totally the cock 18, there will be discharged liquid beer alone, without any pressure or foam. Fig. V illustrates the position of rest, in which the valve 8 and both cocks 12 and 18 are all closed.

From the foregoing description it will be easily understood that, in case it is desired to serve out beer without any foam, the handle 15 must be moved into the position shown in Fig. III and, if the discharge of foam alone be desired then the handle must be placed into the position shown in Fig. IV, from which it follows that any or each of these operations may be effected completely at will.

As is shown in Fig. I, the upper wall 2 constitutes the bottom of a second container 23, which serves as an ice-chest for the liquid contained in container 1 so as to maintain it always under a suitable cool temperature. The water formed by the gradual melting of the ice is discharged through a tube 24 extending vertically downwards, and the lower open end of which extends through the bottom of the apparatus.

The present construction is completed by means of a protecting shield 21 shown in dotted lines in Fig. I, which protects the hand of operator against damage by the gearing, and secured to the cock 12 there is a scraper or blade 22 which serves for stripping off any excess of foam formed in the glass or can, whereby the use of the antihygienic "paddles" may be done away with.

We claim:

1. Apparatus for serving out beer with or without foam, characterized by a container having an inlet for the liquid, a shut-off valve therefor, individual discharge tubes for the liquid and for the foam each controlled by a cock or discharge valve one of which is provided with a handle for operation of the device, both cocks being in relation with each other through intermeshing gears which simultaneously controls the inlet of the liquid into the container.

2. Apparatus for serving out beer with or without foam as claimed in claim 1, in which the inlet valve and the discharge cocks for the liquid and foam are made dependent one from another, so that when the inlet valve is opened, the discharge cock for the foam is also opened but the cock for the liquid is closed and, when the said inlet valve is closed, the cock for the discharge of liquid is opened and the cock for the foam closed, substantially as described and illustrated.

In testimony whereof we have signed our names to this specification.

GAUDENCIO LAMARQUE.
CAMILO RECUERO.